June 3, 1952     C. L. HECKARD ET AL     2,599,055
INTEGRATING DEVICE

Filed July 5, 1947     2 SHEETS—SHEET 1

INVENTORS
CLIFFORD L. HECKARD
BERGER ANDERSON
BY
Reynolds + Beach
ATTORNEYS

June 3, 1952

C. L. HECKARD ET AL 2,599,055

INTEGRATING DEVICE

Filed July 5, 1947

INVENTOR.
CLIFFORD L. HECKARD
BY  BERGER ANDERSON

Reynolds & Beach
ATTORNEYS

Patented June 3, 1952

2,599,055

UNITED STATES PATENT OFFICE 2,599,055

INTEGRATING DEVICE

Clifford L. Heckard and Berger Anderson, Seattle, Wash., assignors to Boeing Airplane Company, a corporation of Delaware Application July 5, 1947, Serial No. 759,114

10 Claims. (Cl. 235—61)

This invention relates to a device for integrating compound quantities, such as the products of force and distance factors, and may be used, for example, to determine the location of the center of gravity of a vehicle, such as an airplane, under different conditions of loading.

In order to obtain the best performance, the center of gravity of an airplane in many instances must be located within a rather small range along the fuselage, almost invariably within the mean aerodynamic chord of the wing and preferably closer to the leading edge of the wing than to the trailing edge. The center of gravity of a partially or fully loaded airplane may be displaced a considerable distance either forward or aft of the center of gravity of the airplane unloaded, depending upon the initial distribution of the load and the disposition of that portion of the load which is expended in flight, whether such load be fuel consumed progressively, or a disposable cargo, such as bombs released in flight, or merchandise dropped in flight by parachute. Moreover if passengers or cargo are to be discharged at intermediate stops along a flight, it frequently is desirable to seat such passengers or to stow such cargo at the beginning of the flight in locations such that the center of gravity will not be displaced appreciably by removal of such passengers or cargo at their proper respective destinations.

In loading an airplane initially, therefore, it is usually desirable not only to determine the center of gravity of the airplane when loaded, but also to calculate, as the loading progresses, what shifts in the center of gravity are produced by the addition of various loads.

Mechanisms for actually balancing, or even weighing, an airplane as or when it is loaded are not very practical, particularly if the airplane is large. It is difficult, therefore, to ascertain from the airplane itself the location of the center of gravity of a loaded airplane. To calculate mathematically the location of the center of gravity as the airplane is loaded is a tedious procedure.

It is the principal object of our invention, therefore, to devise a mechanical integrator capable of determining the center of gravity of an airplane, or the shift in center of gravity occasioned by increasing or decreasing the load by known increments of weight added to or removed from known locations along the length of an airplane fuselage, although in its broader aspects such integrator is capable of integrating various compound quantities, particularly force-distance products. Such device eliminates the necessity of arithmetic calculations, being of the graphic indicating or recording type, so that an unknown factor, such as the center of gravity location, may be read directly under any loading conditions, for example in percentage of the mean aerodynamic chord of the airplane's wing.

In its operation the mechanism automatically takes into account the effect of gross weight upon the shift in center of gravity resulting from the addition or subtraction of a selected weight. Thus it registers, for an initially larger gross weight, a proportionately smaller shift in center of gravity when a given weight is added off the center of gravity than would occur if the same given weight were to be added when the initial gross weight was of smaller value, and vice versa.

With the aid of our integrator not only is the location of the center of gravity indicated directly at all times during the progress of the loading integration, but the total gross weight of the airplane, or the weight added to the weight of the empty airplane, can be ascertained directly.

A particular advantage of our integrator is the rapidity with which it may be operated to determine the center of gravity shift effected by different loading programs, so that before an airplane is loaded, the effect on the center of gravity location of a proposed load distribution may be ascertained with little delay by use of the integrator to see whether it will be satisfactory. If it is found that the loading scheme would locate the center of gravity in an undesirable position, the procedure may be revised as indicated to be necessary by progress of the integration in order to avoid disposition of the center of gravity undesirably at any time during the flight of the airplane. Alternatively the desired center of gravity location may be selected and the integrator will indicate where a given load must be placed to dispose the center of gravity at such location.

Preferred forms of our integrator are shown in the accompanying drawings and described in detail hereafter, but the construction is subject to modification as may be desirable to adapt it best to particular types of airplanes or special uses.

Figure 1:
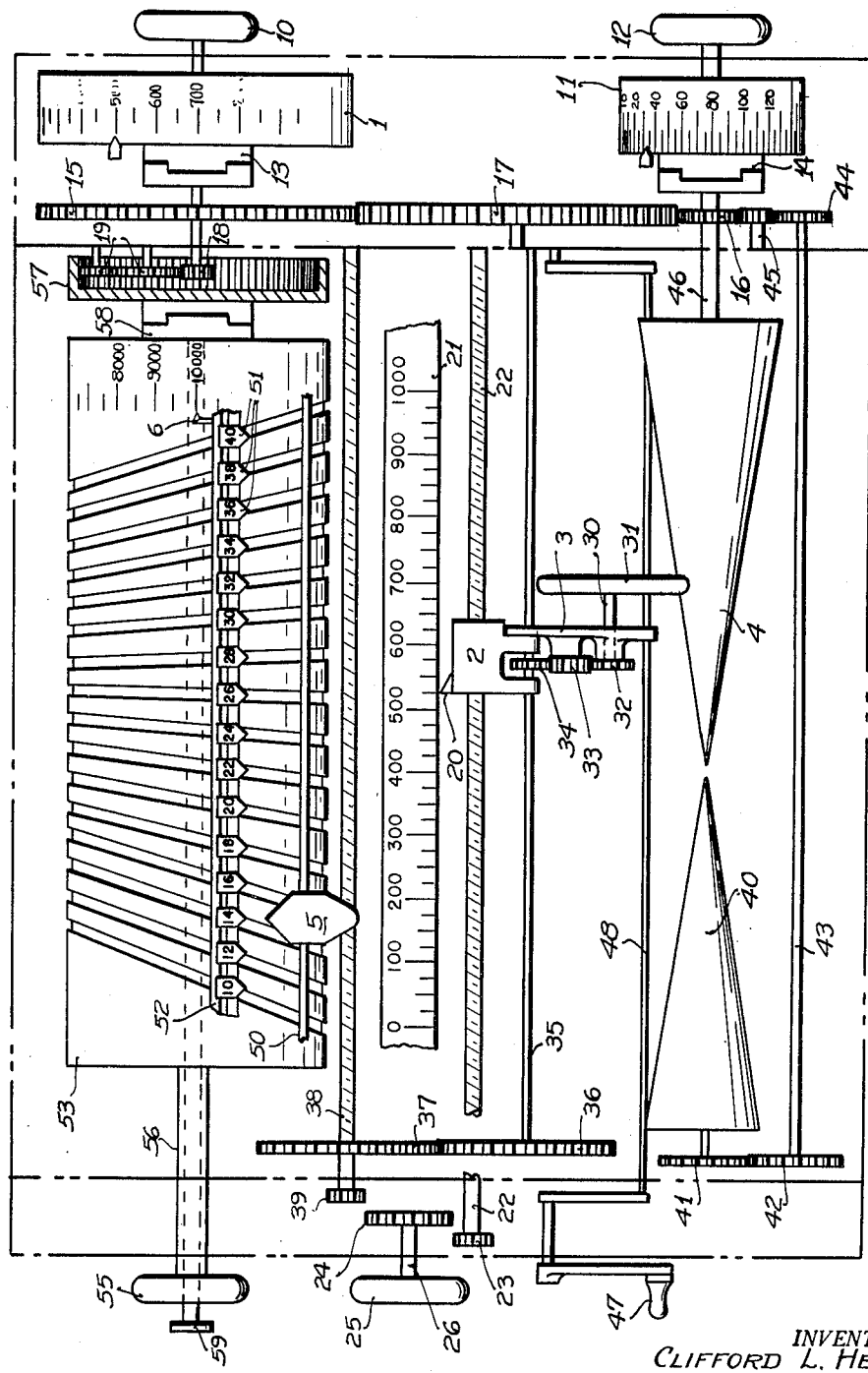
Figure 1 is a somewhat diagrammatic front elevation view of one type of integrator.

The types of integrator illustrated in the drawings are capable of integrating two compound quantities, particularly those composed of force and distance factors. Thus two known forces, acting at different given distances from a reference point, may be integrated so that the distance from the reference point at which the resultant force, equal to the algebraic sum of the two known forces, will act is indicated by the integrator.

Specifically, for example, if the distance from a particular reference point of the center of gravity of an airplane under given loading conditions is known, a selected weight may be added to or subtracted from such initial weight of the airplane at a location a known distance from the reference point, and the integrator will determine the distance from the reference point of the new center of gravity of the airplane after such selected load has been added or subtracted. Alternatively, if the weight of the airplane under given loading conditions and the distance of its center of gravity from a reference point are known, the integrator can determine at what distance from the reference point a selected load must be disposed in order to locate the resultant center of gravity at a particular desired distance from the reference point.

It will be understood that a weight is merely one species of force, namely, the force of gravity acting on a given mass. Consequently our integrator may be utilized to integrate force and distance quantities generally, although a particularly valuable application of it is for determining the center of gravity shift in airplanes which would be effected by different loading programs. In the operation of the integrator four known or assumed factors, two of force and two of distance, are set up on the integrator, and the composite resultant force and the unknown distance at which the resultant force acts are indicated by the integrator, or at least the latter factor is indicated, upon completing the manipulation of the integrator by setting on it such four factors.

It will be convenient to describe the structure and operation of our integrator with reference to its utilization to determine the shift in center of gravity of an airplane for a given loading scheme, but the broader adaptability of the device, as discussed above, should be borne in mind.

In utilizing our airplane center of gravity integrator one must start its operation from a known reference condition, including the weight of the airplane and any load which it might have at such initial condition, and the location of the center of gravity longitudinally of the airplane's fuselage from a known reference point. In order to calculate the shift of the center of gravity occasioned by an alteration in the loading of the airplane, it is then only necessary to know the amount of weight added or subtracted and the location longitudinally of the fuselage at which such weight is added or subtracted. The position of the new center of gravity can then readily be determined.

The shift in the center of gravity position is influenced by four factors: first, the total weight of the airplane prior to the load-adjusting operation; second, the location of the airplane's center of gravity under such conditions; third, the amount of weight added or subtracted; and, fourth, the location along the airplane fuselage at which the weight is to be added or from which it is to be removed. The greater the weight of the airplane prior to the addition or removal of a given load, the smaller will be the shift in the center of gravity position produced by such load addition or removal at a predetermined location. Thus when the weight added or subtracted, and the location at which the change of weight is effected are integrated with the previous airplane weight and center of gravity location factors, they must produce a change in the center of gravity indicating mechanism corresponding to the total or resultant weight of the airplane.

In the form of calculator shown in Figure 1 the elements for selecting successive weights to be added or subtracted are shown as a large load selector 1 having a manipulating handle or knob 10, and a small load selector 11 having a handle or knob 12. Each of these load selector elements is isolated from operating mechanism common to them by clutches 13 and 14, respectively. Preferably these clutches are of the self-disengaging type, so that normally the weight selector element 1 will be rotatively disconnected from its gear 15 of such operating mechanism, and weight selector element 11 normally will be rotatively disconnected from its gear 16 of such operating mechanism. Gears 15 and 16 are interconnected by an idler gear 17 meshing with them. When either of gears 15 and 16 is rotated the other will be rotated correspondingly, but gear 16, rotatable by the small load selector element 11, preferably is much smaller than gear 15 rotatable directly by the large load selector 1, the ratio of the diameter of such gears preferably being 5 to 1. Gear 16 will always rotate through an angle which is a predetermined multiple of the angle through which gear 15 rotates.

The location along the length of the fuselage at which a weight is to be added or from which it is to be removed will be designated by the location of the carriage 2 carrying the indicator or pointer 20, which cooperates with the scale 21. This scale is shown divided into one thousand units, representing a convenient but arbitrary division of the load carrying portion of the fuselage length into loading sections or stations. Reciprocation of the carriage into the desired location may be effected by rotation of the lead screw 22 threaded into a nut carried by the carriage. This lead screw may be rotated to the extent desired for placing the pointer 2 in line with a selected graduation of scale 21 by turning a gear 23 through the medium of a driving gear 24 rotatable by a knob 25 to which such gear is connected by a shaft 26. Preferably this shaft is reciprocable in its bearings by axial movement of a handle or knob 25 so that it may be meshed at will with gear 23, but if desired such knob may be attached directly to the screw 22.

Carriage 2 has an arm 3 pivotally mounted on it, in the swinging end of which is journaled a shaft 30, carrying at one end a friction drive wheel and at its other end a gear 32. Such friction drive wheel is supported by arm 3 in a position such that its periphery rests on the surface of one or the other of coaxial cones 4 and 40. These cones are supported independently with their axes in alignment, and their apexes disposed adjacent to each other, such apexes being located with reference to the scale 21 at a selected reference point. Preferably the position of such reference point along such scale corresponds substantially to the disposition of the center of gravity of the airplane when it is empty.

Cones 4 and 40 are interconnected for simultaneous rotation in opposite directions, such as by a gear 41 secured to cone 40 which meshes with a gear 42 fixed on one end of a shaft 43 extending alongside the cones parallel to their axes and projecting beyond their bases. The end of shaft 43 remote from gear 42 carries a second gear 44, which meshes with the idler gear 45 interposed between gear 44 and gear 16. Rotation of gear 16, either by weight selector 11 or through the gears 15 and 17 by weight selector 1, will rotate in one direction cone 4 through shaft 46 interconnecting such cone and gear 16, and also will rotate cone 40 in the opposite direction through shaft 43 and the gear trains at opposite ends of it. Such reversal of rotation is accomplished by the interposition of idler gear 45 between gears 44 and 16.

The speeds of rotation of cones 4 and 40 will be equal, although their directions of rotation are opposed, because the drive ratio of gears 41 and 42 is the same as the drive ratio of gears 16 and 44, in the particular instance illustrated the diameter of gears 41 and 42 being equal, and the diameter of gears 16 and 44 being equal. It will be understood, then, that the rotation of wheel 31 corresponds to the integrated factors of weight or force change, established by the degree of rotation of the gear 16, and of load change location along the length of the airplane fuselage at which such weight change occurs, reflected in the position lengthwise of cones 4 and 40 at which wheel 31 is set. The direction of rotation of such wheel, depending upon whether it is in contact with cone 4 or 40, corresponds to a shift of the center of gravity aft or forward, respectively.

In order to determine the amount of shift in center of gravity location which will be produced by any selected weight change, it is only necessary to record in some manner the degree of rotation of wheel 31 and to integrate it with the previous center of gravity location and loading of the airplane. Such rotation of wheel 31 will rotate correspondingly gear 32 secured to it through shaft 30, and in turn gears 33 and 34 driven by gear 32, which are carried by arm 3. Gear 34 is splined or otherwise integrally connected to a shaft 35, along which it is slidable by movement of carriage 2 along lead screw 22. As such shaft is rotated it turns gear 36 carried by it, which meshes with gear 37 secured to lead screw 38, in turn to rotate this screw.

It will be understood that the gear trains, composed of gears 32, 33, and 34, and gears 36 and 37, constitute merely a convenient form of transmission for effecting a drive between wheel 31 and lead screw 38. With the transmission illustrated, gears 32 and 34 being of equal diameter, and gears 36 and 37 also being of equal diameter, lead screw 38 will be rotated at the same speed as wheel 31, but in the opposite direction. The pitch of the thread of lead screw 38 is related to the cone angles of cones 4 and 40 and to the diameter of wheel 31, such that the center of gravity indicator 5, carrying a nut threaded on screw 38 which is turned by the gears 32 and 34, rotating together through idler gear 33, will be shifted along that screw the correct amount in one direction or the other. The amount of such shift will depend upon the location on cone 4 or 40 contacted by wheel 31, and to the angle through which the cones are turned representing a given change in load. Consequently the shift of center of gravity indicator 5 to the left or right along rod 50 which supports it is proportional both to each adjustment for a change of weight in the airplane and to the effective location at which such change occurs, as set into the machine. In each instance, wheel 31 is shifted along the cones to the correct location at which weight is to be added to or subtracted from the aircraft, before the amount of weight added or subtracted is set by rotating knob 12, for example.

As mentioned previously, however, the degree of shift in the center of gravity position is affected not only by the actual change in load and the location of such load change, but also necessarily by the total weight of the airplane prior to such change. Compensation for variations in this total weight factor may be accomplished by expanding or contracting the center of gravity reference scale with which the indicator 5 cooperates, in accordance with the total load on the aircraft, so that the scale is expanded more greatly for a larger total weight adjustment than for a smaller total weight adjustment. This operation is accomplished by constructing the center of gravity reference scale of a number of movable tabs 51 mounted slidably on a supporting rail 52. These tabs are interconnected by control mechanism movable in response to shifting of the gross weight indicator, so that as either of the weight selectors is moved to indicate a decreased total weight, the group of tabs will be contracted by reduction of the spacing between them, although the spacing between the several tabs remains uniform, whereas if the weight selectors are moved in accordance with an increase in the loading of the airplane, the group of tabs will be expanded by increasing the spacing between them, such spacing between these several tabs again being uniform.

The degree of such expansion and contraction of the tab group for a given weight change is governed by the factor represented by the tabs. Preferably they are labeled 10 to 40, representing percentage of the mean aerodynamic chord of the airplane's wing. The degree of inclination of the slots will thus depend on the particular airplane. The central tab 51 of the series, labeled 26, remains stationary on rail 52, and could as well be fixed to it, so that it may be designated the reference tab. The tabs at each side of such reference tab move toward or away from it during variation in the tab spacing. In order to maintain the spacing uniform between the several tabs in their various positions of adjustment, it will be evident that those more remote from the central tab 26 must move farther during each adjustment than tabs closer to such central tab.

The mechanism interconnecting the tabs to effect the tab spacing adjustment which we now prefer, includes a drum 53 having a series of grooves or tracks 54 in its periphery, one corresponding to each of the tabs 51. Each such tab has a suitable follower lodged in its groove 54. The groove corresponding to the reference tab bearing the numeral 26 is disposed in a plane perpendicular to the rotative axis of drum 53, while the remaining grooves are of helical form, those on one side of the groove for tab 26 being inclined oppositely from those on the other side. The grooves on either side vary in their inclination angle, those nearest the reference tab groove being inclined the least amount, and those successively further removed toward the ends of the drum increasing progressively in their respective inclination angles. Moreover, the degree of inclination of the grooves at opposite sides of the reference tab and spaced equally from it are the same, although such grooves are inclined in opposite directions.

To set drum 53 corresponding to the initial weight of the airplane, it may be turned directly by rotating knob 55 secured on the supporting shaft 56 of the drum. During the integrating operation, however, the drum will be turned by rotation of the cumulative weight gear train 15, 16 and 17 through the drive gear 57 connected to shaft 56 by a clutch 58. When it is desired to set the drum for the initial weight of the airplane this clutch is disengaged by endwise movement of the clutch disengaging rod 59, extending through a central bore in shaft 56 and projecting beyond the end of the shaft carrying knob 55, where it is enlarged to provide an operating button.

When either of the selector elements 1 and 11 are turned, gear 18, secured on the same shaft as gear 15, is rotated and through the cooperating gear train 19 meshing with the internal drive gear 57, drum 53 is rotated. This gear train is arranged so that when gears 15 and 18 are turned in a direction corresponding to increased load movement of load selectors 1 and 11, drum 53 will also be turned in the load increasing direction. Thus in this particular instance, when either of the selectors 1 and 11 is turned in a clockwise direction as viewed from the right, drum 53 will also be turned clockwise a corresponding amount.

As indicated in the drawings, clockwise rotation of drum 53, as viewed from the right, corresponds to load increasing movement as designated by the total load index pointer 6 cooperable with a gross weight scale marked circumferentially on the drum. As the drum turns in the load increased direction the tabs 51 will be moved farther apart by their followers engaged in grooves 54. Consequently for a given travel of the center of gravity indicator 5 along its rod 50, corresponding to a given additional loading of the airplane, the shift in center of gravity indicated on the scale formed collectively by tabs 51 will be less than would be indicated were the same weight to be added when the airplane's gross weight set into the machine is smaller, spacing the tabs more closely.

In operating the mechanism to determine the center of gravity location of a loaded airplane the integrator first may be set to correspond to the weight empty condition of the airplane. To set the parts in the proper relationship the button of clutch disengaging rod 59 is pressed to disengage clutch 59. Knob 55 is then turned to rotate drum 53 until the gross weight factor indicator 6 is set to register the empty weight of the airplane on the gross weight scale on the right end of the drum. When the drum is in that rotative position the tabs 51 will be in their most contracted relationship for that particular aircraft.

During the foregoing initial adjustment of the drum, crank 47 will be swung to lift rod 48 into contact with wheel 31 for raising it out of engagement with cones 4 and 40. While the wheel is held in that position, knob 25 may be reciprocated to mesh gear 24 with gear 39, whereupon the knob can be rotated as may be necessary to set the center of gravity indicator 5 in alignment with the reference tab labeled 26, corresponding to the known center of gravity position of the empty airplane. Without engaging clutches 13 and 14 the weight selector elements 1 and 11 are rotated to place their zero weight lines opposite their respective index elements.

With the integrator thus prepared for determining the shift in center of gravity which would be occasioned by a given loading procedure, it is manipulated as dictated by the first load which is to be placed in the airplane, or the last load which will be removed from the airplane, depending upon the type of technique to be followed throughout the remainder of the integration. If the integrator is manipulated according to the loads to be added at the various stations, the order in which such loads are set on the integrator is immaterial, the purpose being to determine only the final position of the center of gravity of the loaded airplane. On the other hand, if the sequence according to which the loads for various stations along the route will be discharged is known, it may be preferable to set them on the integrator in the reverse order of their discharge to determine the progressive shift of the center of gravity throughout the flight of the airplane.

Whichever procedure for setting the loads on the integrator is followed, the location at which each load is to be placed is first ascertained, and knob 25 is drawn outward to place gear 24 in mesh with gear 23. With crank 47 preferably swung so that rod 48 will raise wheel 31 from contact with cones 4 and 40, the knob 25 is then rotated until carriage 2 is shifted along lead screw 22 to set pointer 20 in registry with that mark on scale 21 corresponding to the station at which the load is to be added. When the carriage has thus been positioned, knob 25 will be released to disengage gears 23 and 24, and crank 47 will be swung to allow wheel 31 again to contact one of the cones 4 or 40, depending upon the location of carriage 2 along lead screw 22.

If the load to be added in any particular instance is more than three hundred pounds, in the illustrated case, knob 10 will be shifted to the left to engage clutch 13 and the clutch knob will then be rotated until the pointer indicates that the load to be added at the location corresponding to the position occupied by the carriage 2 has been set on the integrator. If, however, the load to be added is less than three hundred pounds, knob 12, instead of knob 10, will be pushed to the left to engage its clutch 14, and then will be rotated until the pointer indicates that the load to be added at the station in quesion has been set on the integrator.

Rotation of either knob 10 or knob 12 with the corresponding clutch engaged will accomplish two operations: first the gear train 15, 17, 16 will rotate shaft 46 and cone 4 in one direction, and simultaneously, through gears 45, 44, 42 and 41, cone 40 in the opposite direction. The cone engaged by wheel 31 in turn will rotate such wheel and gear train 32, 33, 34, 36, and 37 to turn lead screw 38 for shifting center of gravity indicator 5 along rod 50 an amount corresponding to the rotation of the load selector wheel. The position of station indicator 20 along scale 21 will determine the direction in which indicator 5 is moved depending on whether wheel 31 engages cone 4 or cone 40, and the amount of shift will be governed by the diameter of the cone at the point of contact as well as the degree gear 16 is rotated. The second effect of rotating a load selector is to drive gear 18, and by rotation of gears 19 and 57 to turn drum 53 in the load accumulating direction to spread tabs 51 somewhat farther apart. The resultant relationship between center of gravity location index 5 and the adjacent tabs 51 forming the center of gravity location scale will designate the new position of the center of gravity established by addition of such weight, while pointer 6 will indicate the new gross weight or total load.

In similar fashion a complete loading program may be set sequentially upon the integrator, in each instance first by shifting carriage 2 so that pointer 20 designates the station at which the load is to be added, and then by rotating one or the other of the load selector elements 1 and 11, or both of them, until the loading schedule is completed. The final disposition of pointer 5 will indicate the ultimate position of the center of gravity.

Conversely the shift in the center of gravity occasioned by removal in any sequence of loads from the airplane may be determined by setting the pointer 20 to indicate the load station as before, and then turning load selector 1 or 11 to the load to be removed before engaging the respective clutch 13 or 14. When the selector has been set so that its pointer indicates the load to be removed, and carriage 2 set for the station from which such load is to be removed, the selector knob is then shifted to the left to engage its clutch, and while thus engaged, the knob is turned until the weight selector element has been returned to zero. By such action drum 53 will be turned in the load reducing direction to shift tabs 51 closer together at the same time that cones 4 and 40 are rotated to effect relocation of center of gravity indicator 5.

It will be understood from the foregoing description that the calculator may be manipulated to predict the shift in center of gravity location which would occur at any stage of a loading or unloading operation. Conversely, the desired center of gravity position for any loading condition may be assumed and it may then be determined what weight it may be necessary to add at or to remove from a given location along the airplane fuselage to produce such disposition. Thus, the starting gross weight is indicated by pointer 6 and the center of gravity location is designated by pointer 5. The carriage 2 is positioned corresponding to the weight change station, and the weight selector 1 or 11 may be rotated, with its clutch engaged, until the pointer 5 has reached the desired new center of gravity position. The reading on the weight indicator 1 or 11 will then designate the additional load or reduction in load required to effect such alteration in the center of gravity position.

Figure 2:
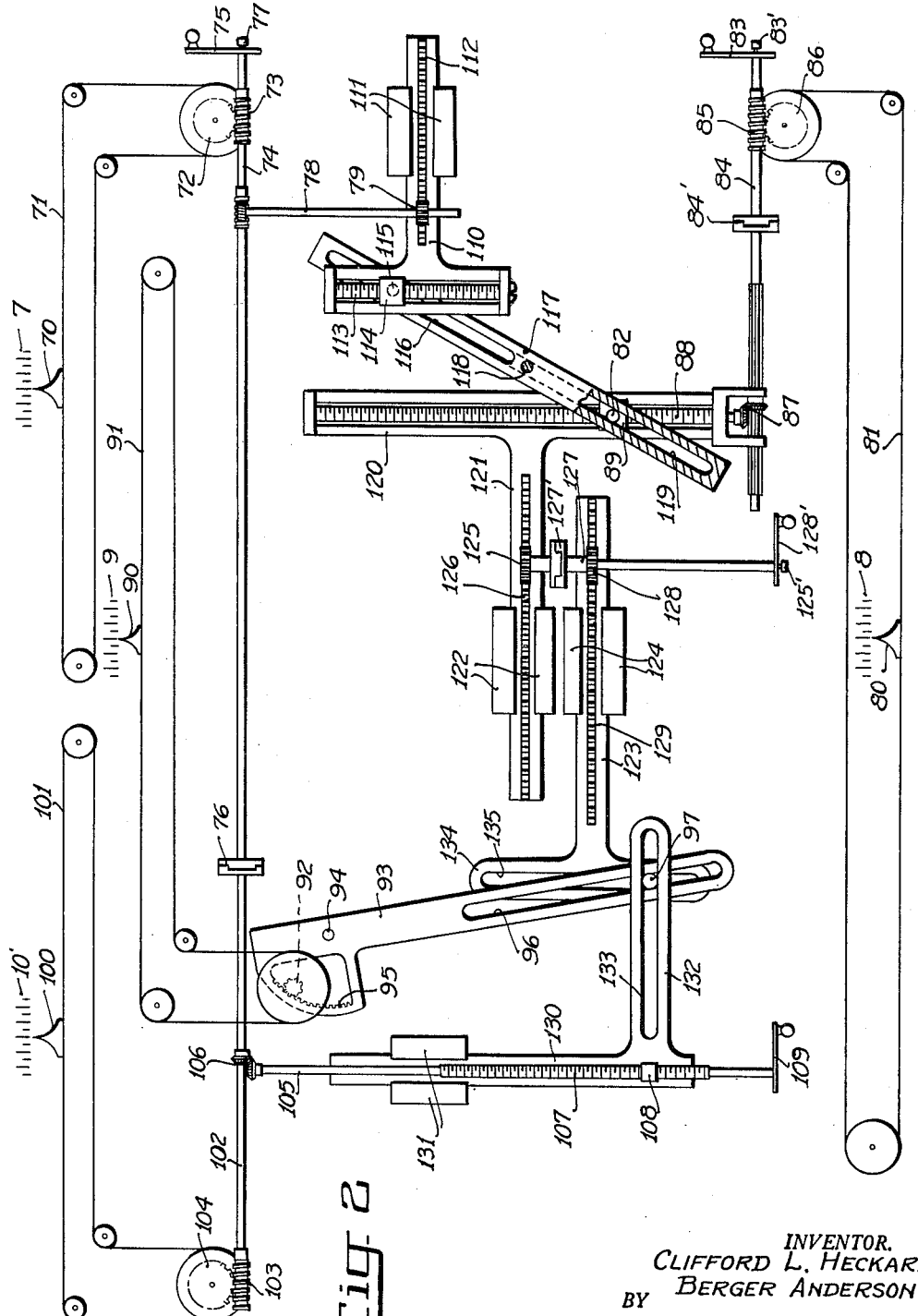
Figure 2 is a diagrammatic view of an alternative type of integrator.

The capabilities of the alternative form of integrator illustrated in Figure 2 are generally similar to those described in connection with the integrator of Figure 1. This device, as a matter of fact, is even more adaptable to use with different airplanes, is more versatile, and may be set somewhat more easily for different initial conditions of gross weight and center of gravity location.

In the integrator of Figure 2 the selected weight indicator, the loading or unloading station indicator, the center of gravity position indicator, and the accumulated weight indicator are all generally of the same type, each constituting a scale on a suitable fixed background and a movable pointer or index cooperating with the fixed scale. Thus with the selected weight scale 7 cooperates the pointer 70, reciprocated along the scale by a belt 71 engaged with it. The loading or unloading station scale 8 cooperates with the pointer 80 moved by the belt 81. The center of gravity position scale 9 has a pointer 90 moved along it by belt 91. The accumulated weight scale 10' cooperates with the pointer 100, which is reciprocated by belt 101. Setting of the selected load pointer 70 shifts the total weight pointer 100 correspondingly, and also effects movement of center of gravity location pointer 90, unless the disposition of the station selector pointer 80 on scale 8 prior to initiation of movement of pointer 70 coincides with the location of pointer 90 along the center of gravity scale 9.

Belt 71 is reciprocated by rotation of worm gear 72 to move pointer 70 along scale 7, which gear is turned by worm 73 mounted on shaft 74. Movement of such belt does not itself actuate the integrating mechanism of the device, but merely serves to indicate the degree of rotation of shaft 74 which is effected by turning crank 75. Such crank turning will correspond to the amount of weight added or removed incorporated in the integration. Since a weight change affects the gross weight of the airplane as well as the location of its center of gravity, shaft 74 may be coupled directly with shaft 102 carrying worm 103 which meshes with the worm gear 104 for driving belt 101 to reciprocate the gross weight pointer 100. In order to effect cumulative rotation of shaft 102 with successive selected weight entries by shaft 74, such shaft will be uncoupled from shaft 102 while the weight selector pointer 70 is being returned to its initial position after each weight setting operation, and then the shafts are recoupled during the next rotation of shaft 74 corresponding to a succeeding weight addition or removal. The coupling of shafts 74 and 102 may be accomplished by clutch 76 which may be disengaged by pressure on button 77 of a clutch control rod extending from the clutch axially through shaft 74 to its end adjacent to crank 75. On release of such button the clutch will reengage.

In order to integrate each rotation of shaft 74 corresponding to a weight added or removed with the station at which such weight is added or from which it is removed, shaft 74 rotates a shaft 78 by a skew or worm gear drive connecting them, and rotation of this shaft in turn reciprocates a slide 110 in fixed guides 111 by the engagement of spur gear 79 carried by shaft 78 with the rack 112 mounted on and extending lengthwise of slide 110.

Integral with one end of slide 110 is a head in which a screw 113 is journaled to rotate about an axis extending transversely of the slide. This screw carries a nut 114 in which is secured a pin 115 slidably received in a groove 116 formed in one end of an integrating bar 117. This bar is swingable about a fixed pivot 118 located substantially midway between its ends and spaced from pin 115 by a distance proportional to the mean aerodynamic chord divided by the fuselage length represented by scale 8. A groove 119 extending lengthwise in the opposite face of bar 117 receives a pin 82 of station locator mechanism. If the station at which a weight is to be added or from which it is to be removed is located other than at the center of gravity of the airplane prior to such weight change, pin 82 must be shifted along slot 119 correspondingly. Such shift is coordinated with the movement of the station indicating pointer 80 along the station scale 8.

The mechanism for effecting coordinated movement of the pointer 80 and the pin 82 includes a crank 83 which turns shaft 84. This shaft carries a worm 85 meshing with a worm gear 86 which is secured to the driving pulley of belt 81 to reciprocate pointer 80. The same shaft 84 carries a bevel gear 87 slidably splined on it, which meshes with bevel gear 87' secured to screw 88 on which a nut 89 carrying pin 82 is threaded. In order to insure that any given location of such pin along screw 88 corresponds properly to the point on scale 8 designated by pointer 80, a normally engaged clutch 84' may be interposed between the parts of shaft 84 carrying worm 85 and bevel gear 87, respectively, which may be disengaged by pressure on the button adjacent to crank 83 of a reciprocable clutch control rod 83' extending through shaft 84, to enable the worm to be turned by crank 83 without rotating the bevel gears and screw 88.

Screw 88 is journaled in the head or crossarm 120 of the slide 121, which slide is linearly reciprocable between guides 122 in a direction perpendicular to the rotative axes of screws 88 and 113, and parallel to the line of reciprocation of slide 110. This slide 121 is aligned with the pivot 118 as a matter of convenience. Preferably the screw 88 should extend approximately equal distances to opposite sides of that pivot, the length of which screw corresponds to the extent of the load-carrying zone lengthwise of the fuselage.

Slide 121 is operatively connected to move a second slide 123 reciprocable in guides 124 along a path parallel to that of slide 121. Preferably the direction and degree of reciprocation of slides 121 and 123 are the same when they are operatively interconnected, although the interconnecting drive means may effect a magnification or diminution of movement so that slide 123 will be moved more or less than slide 121 for a given movement of such latter slide. The operative connection between these slides is illustrated as gearing, including a spur gear 125 meshing with a rack 126 carried by slide 121, which gear turns shaft 127 carrying a second spur gear 128 meshing with a rack 129 on slide 123. The connection between the slides should be disengageable to enable them to be set independently of each other. Slide 123 may be set by turning a crank 128' to rotate the spur gear 128. Gear 125 will not be driven if the portion of shaft 127 between the two spur gears is disconnected by disengagement of a self-engaging clutch 127' incorporated in it, which may be effected by pressing the button adjacent to crank 128' on a reciprocable clutch-actuating rod 125' extending through a bore in shaft 127 to the clutch.

Slide 123 may be reciprocated cumulatively corresponding to the addition or removal of loads sequentially at differing loading stations along an airplane fuselage represented, by moving slide 121 successively. The movements of slide 121 can be accumulated on slide 123 by disengaging clutch 127' while returning the unit weight selector mechanism to its starting position by rotating crank 75 preceding each weight changing manipulation of the mechanism. The incremental shifting of slide 123 is thus effected only by shifts of slide 121 corresponding to load changes. If the effect of the addition of successive loads is being determined, each weight adding manipulation of the mechanism must be started when pins 82 and 115 define a line perpendicular to the directions of movement of slides 110 and 121. In that relationship of the part screw 88 and its nut 89 will be parallel to the pivoted integrating bar 117, and nut 114 and screw 113 will be disposed in overlying registry with one end of such swinging bar. This disposition of the screw 113 and its supporting frame will not interfere with the mounting for pivot 118, because they lie at one side of such pivot. Conversely, if the mechanism is to be manipulated corresponding to successive removal of loads, in its starting position the screw 113 and bar 117 will be displaced from superposed registry, and arm 120 also will be displaced from pivot 118, and these parts will then be brought into superposed registry by rotation of crank 75 to complete the particular manipulation.

Since the bevel gear 87 and the slide head 120 for screw 88 are freely slidable along the splined portion of shaft 84, swinging of integrating bar 117 will effect such sliding if the bar is swung about its pivot 118 when pin 82 is in a position eccentric of such pivot, on whichever side of the pivot it may be. The only difference is that clockwise swinging of the integrating bar when pivot 82 is on the same side of pivot 118 as pin 115 will move slide 121 in the same direction as slide 110, whereas such slide will be shifted in the direction opposite that of slide 110 if the pin 82 is at the side of the integrating bar pivot remote from pin 115, as shown in Figure 2. The side of pivot 118 on which pin 82 is disposed and its distance from such pivot will, of course, be determined by the direction and degree of rotation of crank 83 to turn shaft 84 and screw 88, disposition of the pin coincident with such pivot corresponding to the location of pointer 80 relative to scale 8 at the reference point relative to which the center of gravity of the airplane is determined. The reference point is preferably located near the center of gravity of the unloaded airplane.

Slide 110 will always be shifted to the right, as seen in Figure 2, from a position in which a line joining pin 115 and pivot 118 is perpendicular to slide 110 by rotation of crank 75 in a direction corresponding to a load adding manipulation of the mechanism. If a load is to be removed, the operation of the mechanism will be initiated with pin 115 located in a starting position displaced to the right of pivot 118 corresponding to the magnitude of such load to be removed, and then crank 75 will be turned until pointer 70 has been returned to registry with the zero load point of scale 7, when the line joining pin 115 and pivot 118 again will be perpendicular to the direction of movement of slide 110.

While the movement of slide 123 corresponds to successive integrations of load changes at various stations along the airplane fuselage, it is still necessary to integrate with its movement the effect of an increased or decreased gross weight of the airplane in order to determine the true shift in the center of gravity effected by a given load change at a selected location, as pointed out in describing the other form of our invention. Consequently the cumulative weight shaft 102 is operatively connected to the center of gravity indicating mechanism conjointly with slide 123. Such connecting mechanism is shown as including a shaft 105 perpendicular to such slide and to shaft 102, and driven by bevel gears 106 from shaft 102.

Shaft 105 carries a screw 107 on which is threaded a nut 108. This nut is mounted on a slide 130 reciprocable lengthwise in guides 131 in a direction perpendicular to the direction of reciprocation of the integrating slide 123. The lengthwise disposition of slide 130 controlled by the position of nut 108 along screw 107 regulated by its interconnection with shaft 102 through gears 106, is always coordinated with the position of the gross weight pointer 100 along scale 10'. Any initial setting of the slide 130 and pointer 100 may be established by rotation of handle 109 in one direction or the other to turn screw 107 and shaft 102 while clutch 76 is disengaged.

To integrate changes in the gross weight of the airplane with weights added or removed successively, and the locations at which such respective weights are added or removed, pinion 92, which is secured to the drive pulley for belt 91 is operable to shift the center of gravity location indicating pointer 90, is rotated as a function both of variations in gross weight and weight change increments by interconnecting both gross weight slide 130 and load change and station integrating slide 123 with arm 93. Swinging of this arm about its fixed pivot pin 94 turns an internal gear quadrant 95 carried by such arm and meshing with pinion 92.

The interconnection of slides 123 and 130 with arm 93 may be effected by providing slots in each of these members, the slide slots extending transversely of, and preferably perpendicular to the directions of movement of, their slides, respectively, through all of which slots extends a common pin. The slot 96 in arm 93 extends lengthwise of it, preferably in alignment with pivot 94. Such arm underlies an arm 132 extending transversely of slide 130, having in it a slot 133, and which, as previously stated, is perpendicular to the path of movement of such slide. Similarly slide 123 has an arm or head 134 extending transversely of it, preferably perpendicularly, which is slotted at 135. Pin 97 passes through and fits closely in all the slots 96, 133, and 135, which coordinates the movement of slide 123, slide 130, and arm 93, such slots being long enough so that the movement of either slide is not in the least restricted.

The change in location of pin 97 is always accomplished by the relative movement of slides 123 and 130, such slides usually moving conjointly. Rotation of crank 75 to turn shaft 74 corresponding to an increase in the load of the aircraft will effect reciprocation of slide 123 either to the right or to the left, unless the load location pin 82 is aligned with the integrating bar pivot 118, and simultaneously conjoint rotation of shafts 102 and 105 will move slide 130 downward, as seen in Figure 2, so that a given movement of slide 123 will have less swinging effect on arm 93 than it would have otherwise. The reason for effecting this action is that the greater the weight of the airplane the smaller will be the shift in center of gravity location effected by the addition of a given load at a selected location lengthwise of the airplane fuselage.

Because of the influence of the total weight of the airplane on the degree of shift in the center of gravity for a given loading change, it will be evident that the extent of possible reciprocation of slide 130 must correspond to the range of airplane weight change from its weight empty condition to its maximum gross weight condition, since the travel of nut 108 along the screw 107 corresponds to such weight variation. The length of slot 135 must be at least as great as the total weight change travel of nut 108, so that engagement of pin 97 with an end of slot 135 will not limit the travel of nut 108 within its operating range.

To prevent restricting the movement of slide 123 within its operating range, slot 133 in arm 132 should, of course, extend at least over the range of travel of slide 123. The upper ends of slots 96 and 135 should not be lower than the maximum upward travel of slot 133 when the first two slots are in registry, in which relationship slot 135 is aligned with pivot 94 of arm 93, and the lower ends of slots 96 and 135 should extend below the lower limit of travel downward of slot 133 when slide 130 is in its lowermost position and slide 123 is in its position farthest to the right.

In operating the mechanism of Figure 2 for determining the final center of gravity position of a loaded airplane, rod 77 is pressed to disengage clutch 76, and then crank 109 is turned until the pointer 100 indicates on scale 10' an initial weight condition, such as the weight of the airplane empty. While clutch 76 is still disengaged, crank 75 is turned until pointer 70 is in registry with the zero mark of scale 7. Screw 113 is turned to shift nut 114 along it, depending upon the dimensions, in particular the fuselage length, of the airplane to be loaded. It will be recalled that the distance between pin 115 and the axis of pivot 118 is proportional to the mean aerodynamic chord divided by the fuselage length represented by scale 8.

The button of clutch-actuating rod 83' is pressed to disengage clutch 84', and crank 83 is turned, if necessary, to coordinate the loading station indicated by pointer 80 on scale 8 with the position of nut 89, and then the button is released to enable the clutch to reengage. Pointer 80 should designate the reference point on scale 8 when pin 82 is aligned with pivot 118. With slides 110 and 121 disposed so that a line joining pins 82 and 115 is perpendicular to the paths of movement of these slides, the button of clutch-actuating rod 125' is pressed to disengage clutch 127', and handle 128' is turned until pointer 90 indicates on the center of gravity scale 9 the initial center of gravity of the airplane under the loading conditions for which pointer 100 is set on scale 10'. When the center of gravity is at the reference point arm 93 will be parallel to slide 130. The mechanism is then in condition for manipulation in accordance with the loading procedure.

Crank 83 first is turned to shift the pointer 80 along scale 8 in one direction or the other as may be necessary to indicate the station at which the first load is to be added. Crank 75 is then rotated to move pointer 70 from the zero mark on scale 7 to the point on the scale corresponding to the weight of the added load. The resulting rotation of shaft 74 will move pointer 100 along scale 10' to indicate the new total weight of the airplane with the load added, and slide 130 will be moved downward correspondingly to shift pin 97 away from the pivot 94 of arm 93.

In addition to shifting the gross weight mechanism, rotation of shaft 74 by crank 75 will turn shaft 78 to move slide 110 to the right in Figure 2 from a location in which its screw 113 is aligned with pivot 118. The engagement of pin 115 in groove 116 will swing integrating bar 117 in a clockwise direction as slide 110 is thus reciprocated, the degree of swing depending on the extent crank 75 is turned and the distance between pin 115 and pivot 118. If the load is to be added to the airplane at a station corresponding to the location of pin 82 shown in Figure 2, swinging of bar 117 effected by such movement of slide 110, will shift pin 82 to the left, effecting corresponding reciprocation of slide 121. It will be evident that for a given movement of pin 115 to the right, the distance slide 121 is shifted will depend upon the degree of eccentricity of pin 82 from pivot 118, which determines the leverage of bar 117. If such pin should be aligned with the integrating bar pivot, slide 121 would not be moved at all however much pin 115 might be shifted. When pin 82 is below pivot 118 as seen in the drawing, movement of slide 110 to the right will shift slide 121 to the left. Conversely, if pin 82 is above pivot 118 as seen in the drawing, the same movement of slide 110 would shift slide 121 also to the right. If, in such case, pin 82 should be disposed coaxially with pin 115, slide 121 would be shifted to the right an amount equal to the movement of slide 110, whereas otherwise the movement of slide 121 would be greater or less than the movement of slide 110, depending upon whether pin 82 was disposed farther from or closer to pivot 118 than the distance of pin 115 from such pivot.

The reciprocation of slide 121 effected by the movement of slide 110 described will reciprocate slide 123 an equal amount in the same direction if gears 125 and 128 are equal in size, but in any event the reciprocation of slide 123 will correspond in direction and amount to the movement of slide 121. By such movement of slide 123 arm 93 will be swung conjointly from its starting position, and pointer 90 will be moved correspondingly.

Before the next load-adding manipulation of the mechanism the button of clutch-actuating rod 77 will be pressed to disengage clutch 76, and at the same time clutch-releasing rod 125' will be pressed to disengage clutch 127'. With these clutches thus disengaged crank 75 can be turned until pointer 70 has been moved back to the zero point of scale 7, at which time pins 82 and 115 again will be disposed in a line perpendicular to the path of movement of slide 110. The buttons of clutch-actuating rods 77 and 125' are then released to effect reengagement of clutches 76 and 127'.

Next crank 83 will be turned to shift pointer 80 along scale 8 to the station at which the succeeding contemplated load is to be added, for positioning pin 82 in the corresponding location along its groove 119 by rotation of screw 88. The crank 75 is now turned to move pointer 70 along scale 7 a distance corresponding to the second load to be added. As before, the accompanying rotation of shafts 74 and 78 will reciprocate slide 110 to swing integrating arm 117 about its pivot 118, for reciprocating in turn slides 121 and 123. At the same time the rotation of shaft 102 turning screw 107 will move nut 108 farther downward, so that again the arm 93 will be swung as a function both of the movement of the gross weight change element 132 and the individual or selected added load or force element 123, the movement of the latter element being corrected for the distance from the reference point at which the force of the added load acts. The resultant swinging of arm 93 will, of course, turn gear sector 95 to rotate pinion 92 for shifting pointer 90 along scale 9 to indicate the new location of the center of gravity.

The mechanism may be manipulated similarly corresponding to the addition of any number of successive loads within the capacity of the device, in each instance the clutches 76 and 127' being released and the individual load mechanism returned to the zero position, after which the clutches are reengaged and station pin 82 is set for the next weight adding manipulation.

Like the other form of mechanism, this device may be operated starting at a gross weight of the loaded airplane and a known center of gravity location, and manipulated to correspond to successive removal of loads from different stations on the airplane, alternatively to its use, as described, to determine the effect on the center of gravity location of adding successive loads. For such operation the pointer 70 will be set on scale 7 and the pointer 80 on scale 8, while the clutches 76 and 127' are disengaged, to indicate the load to be removed and the station at which it is located. After the clutches have been reengaged crank 75 will be rotated to return pointer 70 to the zero position on scale 7. In that type of operation, of course, the gross weight indicator 100 will be moved in a direction representing a decrease in the gross weight of the airplane.

Moreover, such weight adding and weight removing manipulations may be intermingled in any sequence. Similarly, if an error is made at any time, or if it is desired to change the loading or unloading plan, the mechanism may be operated in reverse to remove the effect of the undesired step, and its operation continued thereafter either by manipulation corresponding to a substitute loading or unloading step, or by merely omitting any substitute step if desired.

Instead of manipulating the device by selecting a given load to be added to or removed from the airplane, the gross weight indicator 100 may be set at a position corresponding to a given loading of the airplane by turning crank 75 with clutch 76 engaged, and then, with clutch 127' disengaged by pressure on the button of clutch-actuating rod 125', crank 128' may be turned until the indicator 90 designates the center of gravity location of the airplane thus loaded. With the gross weight and center of gravity indicators thus positioned clutch 76 may be disengaged and crank 75 turned to return pointer 70 to the zero mark of scale 7 to dispose screw 113 of slide 110 in overlying registry with screw 88 of slide 121.

If the actuating rods of clutches 76 and 127' are now released to effect reengagement of these clutches, and with pin 82 set along screw 88 corresponding to a selected loading station, crank 75 may be turned until pointer 90 indicates a desired new center of gravity position on scale 9. The location of pointer 70 will then designate on scale 7 the load which must be added at the station selected to locate the center of gravity in such desired position.

Alternatively, the pointer 100 may be set with respect to the scale 10' to indicate a given gross weight condition and pointer 90 set on scale 9 to designate a corresponding center of gravity position in the manner previously described, after which the location at which a selected load must be added to relocate the center of gravity in a desired manner can be determined. Without regard to the position of pointer 80 along scale 8, crank 75 may be turned to move pointer 70 from a zero starting position to that corresponding to the selected load to be added. Thereafter crank 83 may be turned until the pointer 90 designates the desired new center of gravity position on scale 9. Pointer 80 will then indicate on scale 8 the station at which the selected load to be added must be placed in order to dispose the center of gravity in the stipulated position.

It will be seen, therefore, that starting with an initial known force and distance relationship set into the integrator, such as the gross weight and center of gravity location of an airplane, of the additional three factors including incremental force change, such as a load to be added or removed, the distance from a reference point at which such force acts, such as the station at which the incremental load is to be added or from which it is to be removed, and the final distance from the reference point at which the resulting force acts, such as the new center of gravity location, any two may be set on the integrator in addition to the initial force and distance quantities, and the third factor can be determined by effecting the proper factor-setting manipulation of the device, as described. Also the new total or resultant force may be indicated, if desired.

We claim as our invention:

1. A machine for determining the center of gravity location of a composite load, comprising total load means movable in accordance with changes in the total load, added load center of gravity location means settable to indicate the center of gravity location of a load to be added, composite load center of gravity location means movable to indicate the center of gravity location of the composite load, added load means movable to represent a load to be added, said composite load center of gravity location means including a pointer movable by said added load means and a series of movable center of gravity position tabs cooperating with said pointer, means operatively connecting said added load means to said composite load center of gravity location means, and controlled by said total load means and said added load center of gravity location means, and operable to effect movement of said composite load center of gravity location means by and during movement of said added load means to represent a load to be added, said total load means and said added load center of gravity location means controlling the degree of such movement of said composite load center of gravity location means thus effected by said added load means, disconnecting means operable to disconnect said added load means to enable resetting thereof, independently of said total load means and said composite load center of gravity location means, to an initial position for subsequent setting of said added load means in accordance with additional added loads to be integrated with the total load and its center of gravity location, and means movable to vary the spacing of said tabs by movement of the total load means in accordance with changes in the total load.

2. A machine for determining the center of gravity location of a composite load, comprising total load means movable in accordance with changes in the total load, added load center of gravity location means settable to indicate the center of gravity location of a load to be added, composite load center of gravity location means movable to indicate the center of gravity location of the composite load, lever means operable to effect movement of said composite load center of gravity location means, added load means movable to represent a load to be added and being operatively connected to swing said lever means, means cooperating with said lever means and said added load means and controlled by said total load means and said added load center of gravity location means to vary the position along said lever means at which the added load means act for varying the degree of swing of said lever means by a given movement of the added load means, and thereby the movement of said composite load center of gravity location means, by and during movement of said added load means to represent a load to be added, and disconnecting means operable to disconnect said added load means to enable resetting thereof, independently of said total load means and said composite load center of gravity location means, to an initial position for subsequent setting of said added load means in accordance with additional added loads to be integrated with the total load and its center of gravity location.

3. The machine defined in claim 2, in which the composite load center of gravity location means includes a pointer and a scale relatively movable, the lever means being operable to effect such relative movement of said pointer and said scale.

4. A machine for determining the center of gravity location of a composite load, comprising added load means movable to represent a load to be added, a conical cam rotatable by movement of said added load means in representing a load to be added, composite load center of gravity location means including a movable pointer and a series of movable tabs cooperating with said pointer, drive means operable to effect reciprocation of said pointer relative to said series of tabs, and including a wheel engageable with and rotatable by said conical member to effect pointer reciprocating movement of said drive means, said wheel being movable lengthwise of said conical member to engage portions thereof of varying size in accordance with the center of gravity location of the load to be added for which said added load means is moved, and total load means movable by successive movements of said added load means to represent successive loads to be added, and operable by such movements progressively to decrease the spacing of said tabs of said composite load center of gravity location means.

5. A machine for determining the center of gravity location of a composite load, comprising added load slide means reciprocable to represent a load to be added, added load center of gravity location means reciprocable in accordance with the location of the center of gravity of a load to be added, integrating slide means operatively connected to said added load slide means and to said added load center of gravity location means, and reciprocable by reciprocation of said added load slide means to a degree controlled by the reciprocative disposition of said added load center of gravity location means, composite load center of gravity location means, lever means operable to move said composite load center of gravity location means to effect indication thereby of the center of gravity location of the composite load, connecting means interconnecting said integrating slide means and said lever means and operable to effect swinging of said lever means by reciprocation of said integrating slide means, total load means operatively connected to said connecting means and operable to control said connecting means for varying the degree of swing of said lever means effected by a given movement of said integrating slide means, and load accumulating means operatively connecting said added load means and said total load means, and operable to effect progressive movement of said total load means by successive load adding reciprocative movements of said added load slide means.

6. A machine for determining the center of gravity location of a composite load, comprising added load slide means reciprocable to represent a load to be added, added load center of gravity location means reciprocable in accordance with the location of the center of gravity of a load to be added, integrating slide means, first lever means operatively connecting said added load slide means, said added load center of gravity location means, and said integrating slide means, and operable to reciprocate said integrating slide means by reciprocation of said added load slide means to a degree controlled by the reciprocative disposition of said added load center of gravity location means, composite load center of gravity location means, second lever means operable to move said composite load center of gravity location means to effect indication thereby of the center of gravity location of the composite load, connecting means interconnecting said integrating slide means and said second lever means and operable to effect swinging of said second lever means by reciprocation of said integrating slide means, total load means operatively connected to said connecting means and operable to control said connecting means for varying the degree of swing of said second lever means effected by a given movement of said integrating slide means, and load accumulating means operatively connecting said added load means and said total load means, and operable to effect progressive movement of said total load means by successive load adding reciprocative movements of said added load slide means.

7. The machine defined in claim 6, and adjusting means interconnecting the added load slide means and the first lever means, and adjustable to vary the degree of swinging of the first lever means effected by a given reciprocative movement of the added load slide means.

8. A machine for determining location of resultant forces or for similar integrating operations, comprising a first means settable to represent the resultant force, a second means cooperable with said first means and operable to represent the location of said force relative to a reference point, a third means settable to represent a force component of said resultant force, a fourth means settable to represent the location of such force component with respect to such reference point, means interconnecting said third and first means and operable to adjust the setting of said first means compensatively by the operation of setting said third means, means interconnecting said second, third and fourth means and operable to shift the position of said second means by the operation of setting said third means, by an amount determined operatively by the setting of said fourth means, and disengaging means selectively operable to disconnect said second means from said third means to enable resetting of said third means independently of said second means to an initial position for a subsequent operative positioning of said second means, while said second means is interconnected with said third means, by the operation of setting said third means in accordance with a third force at a selected location with respect to such reference point, to be algebraically combined with the resultant force for which said first means is set previously to determine the location with respect to such reference point of the new resultant force.

9. The integrating machine defined in claim 8, and additional disengaging means selectively operable to disconnect the first and third means to enable resetting of the third means independently of the first means to an initial position for a subsequent operative adjustment of said first means by the operation of setting the third means in accordance with such third force to be algebraically combined with the resultant force for which the first means was set previously.

10. The integrating machine defined in claim 8, and disengaging means for the fourth means to enable setting thereof independently of the third means into different cooperative positions with respect to the third means.

CLIFFORD L. HECKARD.
BERGER ANDERSON.

REFERENCES CITED

The following references are of record in the file of this patent:

UNITED STATES PATENTS

| Number | Name | Date |
| --- | --- | --- |
| 2,179,822 | Imm | Nov. 14, 1939 |
| 2,319,322 | Hefel | May 18, 1943 |
| 2,373,504 | Schlieben et al. | Apr. 10, 1945 |
| 2,373,566 | Imm | Apr. 10, 1945 |